United States Patent
Xu et al.

(10) Patent No.: US 12,304,014 B1
(45) Date of Patent: May 20, 2025

(54) AUTOMATIC WELDING PRODUCTION LINE FOR LARGE COMPLEX WORKPIECE AND PRODUCTION METHOD

(71) Applicant: Tianjin University, Tianjin (CN)

(72) Inventors: Lianyong Xu, Tianjin (CN); Kangda Hao, Tianjin (CN); Hao Wang, Tianjin (CN); Yongdian Han, Tianjin (CN); Lei Zhao, Tianjin (CN); Wenjing Ren, Tianjin (CN); Tianzhu Wang, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 18/925,096

(22) Filed: Oct. 24, 2024

(30) Foreign Application Priority Data

Jan. 12, 2024 (CN) .......................... 202410048146.7

(51) Int. Cl.
*B23K 9/095* (2006.01)
*B23K 37/04* (2006.01)

(52) U.S. Cl.
CPC ........ *B23K 9/0956* (2013.01); *B23K 37/0443* (2013.01)

(58) Field of Classification Search
CPC .......................... B23K 9/0956; B23K 37/0443
USPC ..................................................... 219/124.1
See application file for complete search history.

(56) References Cited

FOREIGN PATENT DOCUMENTS

| CN | 107470843 A | | 12/2017 | |
|---|---|---|---|---|
| CN | 110711983 A | * | 1/2020 | ............ B23K 31/02 |
| CN | 215546019 U | | 1/2022 | |
| CN | 216370868 U | | 4/2022 | |

* cited by examiner

*Primary Examiner* — Steven W Crabb
*Assistant Examiner* — Ket D Dang
(74) *Attorney, Agent, or Firm* — Bayramoglu Law Offices LLC

(57) ABSTRACT

An automatic welding production line for a large complex workpiece includes a base station, a welding robot, a displacement worktable, an auxiliary robot, a feeding system and a blanking system. The displacement worktable has multi degrees of freedom, the position and angle of the workpiece can be flexibly adjusted during welding to meet the welding requirements of any position and angle of the welding equipment, thereby realizing the welding operation of large complex special-shaped three-dimensional components, and multi-point welding at any point can be realized through the cooperation of the welding robot and the auxiliary robot. The control system controls the robot and the feeding and blanking system to cooperate with the displacement worktable to realize automatic feeding, welding and blanking operations, the welding parameters and operations can be automatically adjusted for the special components of the structure, to realize integration and intelligence, improve production efficiency and reduce production costs.

4 Claims, 13 Drawing Sheets

AUTOMATIC WELDING PRODUCTION LINE FOR LARGE COMPLEX WORKPIECE AND PRODUCTION METHOD

CROSS REFERENCE TO THE RELATED APPLICATIONS

This application is based upon and claims priority to Chinese Patent Application No. 202410048146.7, filed on Jan. 12, 2024, the entire contents of which are incorporated herein by reference.

TECHNICAL FIELD

The present invention relates to the technical field of welding production lines, and specifically relates to an automatic welding production line for a large complex workpiece and a production method.

BACKGROUND

Grille arch frame of the subway is in great demand as an important component of subway tunnel construction, and with the gradual increase of the subway, the shape of the subway tunnel becomes more specific, which leads to the change of the structure of the grille arch frame, so there are many kinds of subway grilles with many different types, and the shape, size, and specifications of different kinds of grilles are quite different, which has the characteristics of many types of grilles and small demand for the number of grilles of the same type. In order to ensure the construction progress and reduce the cost, welding systems such as the one disclosed in CN115740889A are now used to replace the manual grille welding operation. However, due to the non-uniform structure and various types of grilles, it is necessary to change the welding parameters frequently to meet the welding requirements, which greatly improves the operation time and cost, and some grilles have a special spatial structure in the three-dimensional structure, many positions cannot be welded due to the special position and angle, resulting in lack of welding, which requires manual repair welding, it has the problems of high labor intensity, poor operation environment, difficult personnel management and unpredictable construction period, and cannot realize the automatic welding of complex three-dimensional workpieces, as a result, the cost and cycle of subway construction are seriously increased, the present invention provides an automatic welding production line for a large complex workpiece and a production method to solve the above problems.

SUMMARY

The present invention provides an automatic welding production line for a large complex workpiece and a production method, and realizes the integration, intelligence, and automation of the welding operation for large complex three-dimensional workpieces.

The technical scheme adopted by the present invention to solve the above technical problems is:
an automatic welding production line for a large complex workpiece, including a base station, a welding robot, a displacement worktable, an auxiliary robot, a feeding system, and a blanking system, the displacement worktable is arranged in the base station, the welding robot and the auxiliary robot are arranged on the base station and located on both sides of the displacement worktable, and move along the base station, the blanking system is arranged on the base station and located below the displacement worktable, the feeding system includes a main reinforcement feeding structure and a hopper, the main reinforcement feeding structure is connected to the base station, and the hopper is arranged on the auxiliary robot;

the main reinforcement feeding structure includes a chain plate conveyor belt and a placing frame, the placing frame is arranged on the base station and located above the displacement worktable, the chain plate conveyor belt is located on one side of the placing frame, and a discharging end of the chain plate conveyor belt is connected to the placing frame; the blanking system includes a silo and a conveyor belt, the silo is arranged on the base station and located below the displacement worktable, a receiving end of the conveyor belt is connected to the silo.

Further, the displacement worktable includes a support frame, a main rotary power structure, a main frame, a sub-power structure, a sub-frame, and a worktable, the support frame is arranged in a central part of the base station, the main frame is arranged between the support frames, the main rotary power structure is arranged at an end of the main frame and located between the main frame and the support frame, the sub-frame is arranged in the main frame through the sub-power structure, the sub-power structure is arranged at front and rear ends of the sub-frame, and the worktable is arranged on the sub-frame.

Further, the welding robot includes a moving base, a first manipulator, a seam-finding structure, and a first welding structure, the first manipulator is arranged on the base station through the moving base, and the seam-finding structure and the first welding structure are arranged on the first manipulator and cooperated with the worktable.

Further, the auxiliary robot includes a mounting base, a second manipulator, an observation structure, a second welding structure and an auxiliary fixture, the second manipulator is arranged on the base station through the mounting base, and the observation structure, the second welding structure and the auxiliary fixture are arranged on the second manipulator and cooperated with the worktable.

Further, the sub-power structure includes a sub-rotary power device and a displacement device, the displacement device is arranged inside the main frame, and the sub-rotary power device is arranged at an end of a sub-frame to drive the sub-frame to rotate, the displacement device is connected to the sub-rotary power device to drive the sub-rotary power device to translate.

The displacement device includes a displacement guide rail, a sliding table, and a translation power device, the displacement guide rail is arranged on an inner side of the main frame, the sliding table is movably arranged on the displacement guide rail and connected to the sub-rotary power device, the translation power device is connected to the sliding table.

Further, the main rotary power structure includes a main rotary positioner and a main rotary shaft, the main rotary positioner and the main rotary shaft are respectively arranged on an outside of the two ends of the main frame to drive the main frame to rotate, the sub-rotary power device includes a sub-rotary positioner, a sub-rotary shaft, and a rotary table, the sub-rotary positioner and the sub-rotary shaft are arranged on the sliding table and located at both ends of the sub-frame, the rotary table is connected to the sub-frame through a hinge and is connected to the sub-rotary positioner and the sub-rotary shaft.

Further, a positioning fixture structure is arranged on the worktable, and the positioning fixture structure is arranged on a surface of the worktable, and cooperates with the seam-finding structure and the observation structure.

Further, the sub-frame is arranged in pairs, and the sub-power structure is arranged with the sub-frame correspondingly, the welding robot and the auxiliary robot are symmetrically arranged on both sides of the displacement worktable and cooperate with the sub-frame.

Further, a control system is further included, the control system with the welding robot, the displacement worktable, the auxiliary robot, the feeding system and the blanking system are in a signal connection, and the control system controls a linkage of the welding robot, the displacement worktable, the auxiliary robot, the feeding system and the blanking system.

A production method of the automatic welding production line for the large complex workpiece, including the following steps:

S1, preliminary preparation: inputting overall model parameters, part specification parameters, construction step parameters and part position parameters in each step of an overall workpiece into a database as construction parameters;

S2, part placement: placing the main reinforcement on the main reinforcement feeding structure according to a specification, a model and a welding sequence, placing an auxiliary part in the hopper, and hoisting the hopper to the moving base, the auxiliary parts include a connecting plate and a special-shaped part;

S3, welding preparation: starting the equipment, controlling the worktable to level and adjusting a position and an angle according to specifications of the whole workpiece; starting the main reinforcement feeding structure, and conveying the main reinforcement to the placing frame through the chain plate conveyor belt;

S4, reclaiming and adjustment: controlling the auxiliary robot to grasp the connecting plate from the hopper, placing it on the worktable and fixing it, then controlling the auxiliary robot to grasp the main reinforcement from the placing frame and placing it on the worktable to contact with the connecting plate, detecting the size, position and shape of the main reinforcement through the observation structure, and matching with the parameters in the database, controlling the positioning fixture structure to correct the main reinforcement according to a matching result, and fixing by spot welding through the second welding structure, and then disengaging the auxiliary robot from the main reinforcement;

S5, preliminary welding operation: confirming a welding position between the main reinforcement and the connecting plate through the welding robot according to the seam-finding structure, and welding through the first welding structure to form a primary workpiece; during the welding process, detecting the position of the main reinforcement by the auxiliary robot through the observation structure, and adjusting an over-limit position through the auxiliary fixture;

S6, mid-term welding operation: after completing the welding of a primary workpiece, identifying and detecting the special-shaped parts in the hopper by the auxiliary robot through the observation structure, clamping the special-shaped parts through the auxiliary fixture, adjusting the position of the special-shaped parts according to the parameters in the database to make them contact with the main reinforcement, and then carrying out the welding operation successively through the welding robot and the auxiliary robot to weld the special-shaped parts on the primary workpiece to form a secondary workpiece;

S7, post-welding operation: after completing the welding of the secondary workpiece, controlling the displacement worktable to adjust its own position and angle, adjusting the positions of the secondary workpieces on the two worktables to make them in contact with each other, and carrying out the welding operation successively through the welding robot and the auxiliary robot to weld the secondary workpieces to each other to form an whole workpiece with the position adjustment of the displacement worktable; and S8, workpiece blanking: clamping the whole workpiece through an auxiliary fixture of the auxiliary robot, then disengaging the clamping of the whole workpiece from the positioning fixture structure, controlling the displacement worktable to be separated from the whole workpiece, and then moving the whole workpiece downward through the auxiliary fixture of the auxiliary robot, landing in the silo, and then conveying the whole workpiece to a finished product area through the conveyor belt to complete the welding operation.

The beneficial effects of the present invention are as follows: the position and angle of the workpiece can be flexibly adjusted during welding by using a multi degrees of freedom displacement worktable to meet the welding requirements of any position and angle of the welding equipment, thereby realizing the welding operation of large complex special-shaped three-dimensional components, and multi-point welding at any point can be realized through the cooperation of the welding robot and the auxiliary robot, and automatic welding can be fully realized without manual repair welding operation;

the control system controls the robot and the feeding and blanking system to cooperate with the displacement worktable to realize automatic feeding, welding and blanking operations, the welding parameters and operations can be automatically adjusted for the special components of the structure, so as to realize integration and intelligence, effectively improve production efficiency and reduce production costs.

Figure 1:
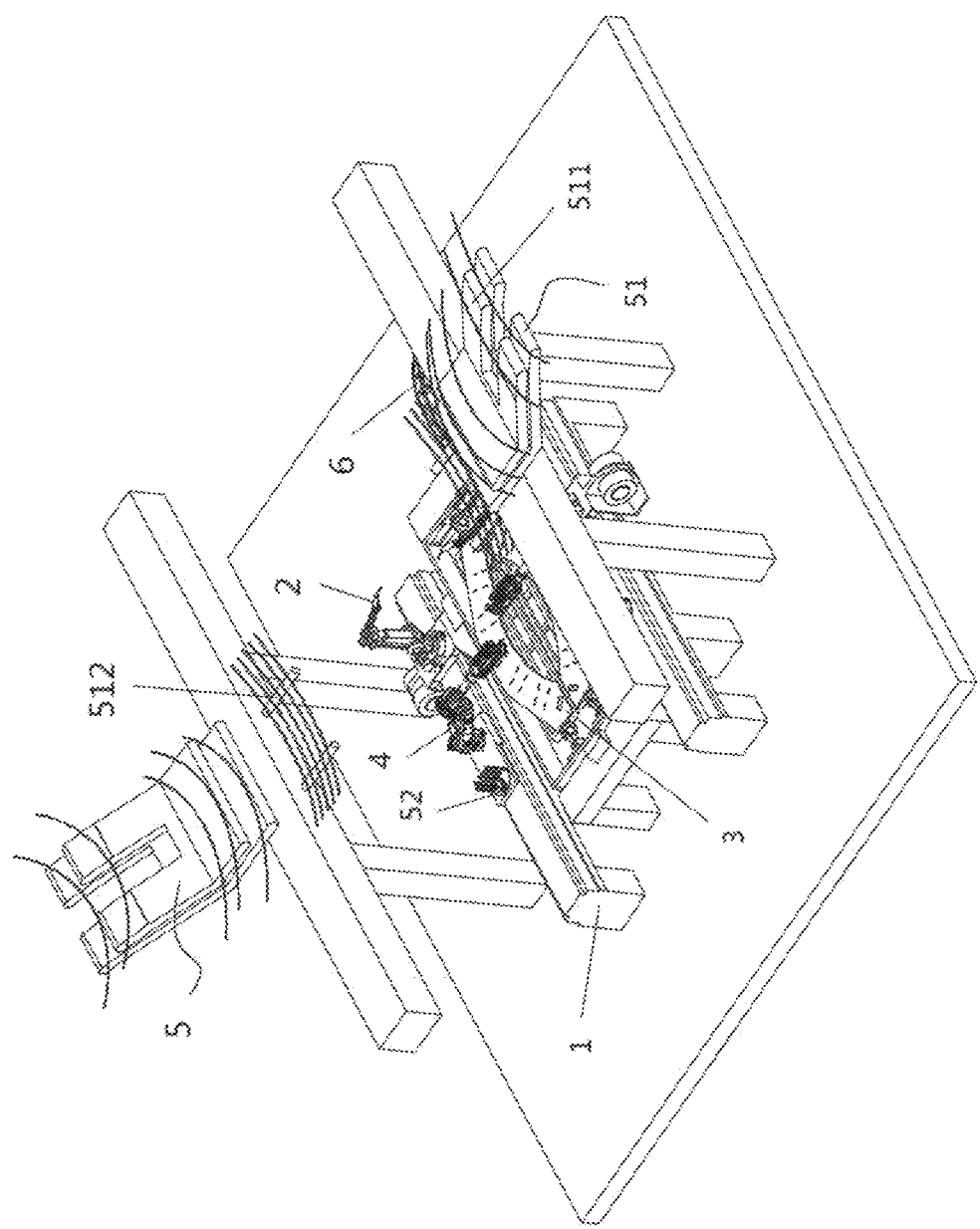
FIG. 1 is a schematic diagram of an overall structure of a main reinforcement feeding by using structure 1 of the present invention.

Reference numerals in figures: 1, a base station; 2, a welding robot; 21, a moving base; 22, a first manipulator; 23, a seam-finding system; 24, a first welding structure; 3, a displacement worktable; 31, a support frame; 32, a main rotary power structure; 33, a main frame; 34, a sub-power structure; 341, a sub-rotary power device; 342, a displacement device; 35, a sub-frame; 36, a worktable; 37, a positioning fixture structure; 4, an auxiliary robot; 41, a mounting base; 42, a second manipulator; 43, an observation structure; 44, a second welding structure; 45, an auxiliary fixture; 5, a feeding system; 51, a main reinforcement feeding system; 511, a chain plate conveyor belt; 512, a placing frame; 52, a hopper; 6, a blanking system.

DETAILED DESCRIPTION OF THE EMBODIMENTS

The following clearly and completely describes the technical solutions in embodiments of the present invention in combination with the drawings attached to the specification. Apparently, the described embodiments are only some but not all of the embodiments of the present invention. All other embodiments obtained by those of ordinary skill in the art based on the embodiments of the present invention without involving any creative effort shall fall within the scope of protection of the present invention.

In the above description of the present invention, it is to be understood that the orientation or positional relationship indicated by the terms Terms 'center', 'up', 'down', 'front', 'back', 'left', 'right', 'vertical', 'horizontal', 'top', 'bottom', 'inside', 'outside', etc. is based on the orientation or positional relationship shown in the accompanying drawings, merely for ease of description and simplification of the description of the present invention, and not to indicate or imply that the referenced device or element must have a particular orientation and be constructed and operative in a particular orientation, and thus may not be construed as a limitation on the present invention.

As shown in FIG. 1, FIG. 2, FIG. 3, and FIG. 4, an automatic welding production line for a large complex workpiece, including a base station 1, a welding robot 2, a displacement worktable 3, an auxiliary robot 4, a feeding system 5 and a blanking system 6, the displacement worktable 3 is arranged in the base station 1, the welding robot 2 and the auxiliary robot 4 are arranged on the base station 1 and located on both sides of the displacement worktable 3, and move along the base station 1, the blanking system 6 is arranged on the base station 1 and located below the displacement worktable 3, the feeding system 5 includes a main reinforcement feeding structure 51 and a hopper 52, the main reinforcement feeding structure 51 is connected to the base station 1 and located above the displacement worktable 3, and the hopper 52 is arranged on the auxiliary robot 4 and located on the side of the displacement worktable 3.

The specific embodiment of the present invention is applied to the welding production of the subway grille, the main part of the grille is the main reinforcement, since the main reinforcement is arranged on the inner and outer sides of the grille arch frame, it includes the main reinforcement with two different curvatures, the auxiliary parts include special-shaped parts and connecting plates, the special-shaped parts include U-shaped auxiliary reinforcement and Z-shaped auxiliary reinforcement, the grille is a special-shaped structure in three-dimensional space due to the arranging of special-shaped parts, during the welding operation, firstly, the main reinforcement and the connecting plate need to be welded into a primary workpiece, secondly, the U-shaped auxiliary reinforcement and the Z-shaped auxiliary reinforcement are welded on the primary workpiece to form the secondary workpiece, and thirdly, the secondary workpiece is combined with each other and welded into the whole workpiece, during the welding process, the welding points are distributed in all parts of the three-dimensional space, and the final welding operation requires flip-butt welding of the secondary workpiece, and finally directly passes through the displacement worktable 3 for blanking, resulting in a large change in the position of the workpiece during the entire welding process and a special position of the positioning point, the present invention can meet the flexible adjustment of the placement position and angle of the workpiece at all levels through the multi degrees of freedom displacement worktable 3, and can weld the weld at any position and angle with the welding robot 2 and the auxiliary robot 4, and integrates the automatic operation of the detection, adjustment and correction of the size and position; at the same time, the feeding system 5 cooperates with the robot to realize the automatic conveying and reclaiming of the parts, after the welding is completed, the automatic blanking and conveying to the finished product area are carried out through the blanking system 6, and the fully automatic welding operation is realized, which has the advantages of high automation, integration and intelligence.

As shown in FIG. 6, FIG. 7, FIG. 8, FIG. 9, FIG. 10, and FIG. 11, further, the displacement worktable 3 includes a support frame 31, a main rotary power structure 32, a main frame 33, a sub-power structure 34, a sub-frame 35 and a worktable 36, the support frame 31 is arranged in a central part of the base station 1, the main frame 33 is arranged between the support frames 31, the main rotary power structure 32 is arranged at an end of the main frame 33 and located between the main frame 33 and the support frame 31, the sub-frame 35 is arranged in the main frame 33 through the sub-power structure 34, the sub-power structure 34 is arranged at front and rear ends of the sub-frame 35, and the worktable 36 is arranged on the sub-frame 35.

The displacement worktable 3 realizes the position and angle adjustment of the whole workpiece through the main rotary power structure 32 driving the main frame 33, the main rotary power structure 32 is arranged at both ends of the main frame 33, the main frame 33 is driven by the main rotary positioner to rotate around the shaft, so that the main frame 33 and the workpiece on it are rotated, and then cooperate with the welding and clamping operations of the welding robot 2 and the auxiliary robot 4; the main frame 33 is a rectangular frame, and two sub-frames 35 are arranged in the main frame 33, the two sub-frames 35 are driven through the sub-power structure 34 to realize the operation of rotation, translation, closure or expansion, so as to meet the welding operation of parts at different positions and angles, the sub-rotary power device 341 is arranged at the end of the sub-frame 35 to drive the sub-frame 35 to rotate around the shaft, the displacement device 342 is arranged outside the sub-rotary power device 341 to drive the sub-rotating power device 341 and the sub-frame 35 to translate, the displacement device 342 at both ends of the two sub-frames 35 is flexibly adjusted under different action modes, so that the two sub-frames 35 are in different positions to meet the flexible adjustment of the position and angle of the parts in the three-dimensional space; through the above structure, the requirements of multi-point welding of parts and angle adjustment of the whole workpiece are realized.

Figure 9:
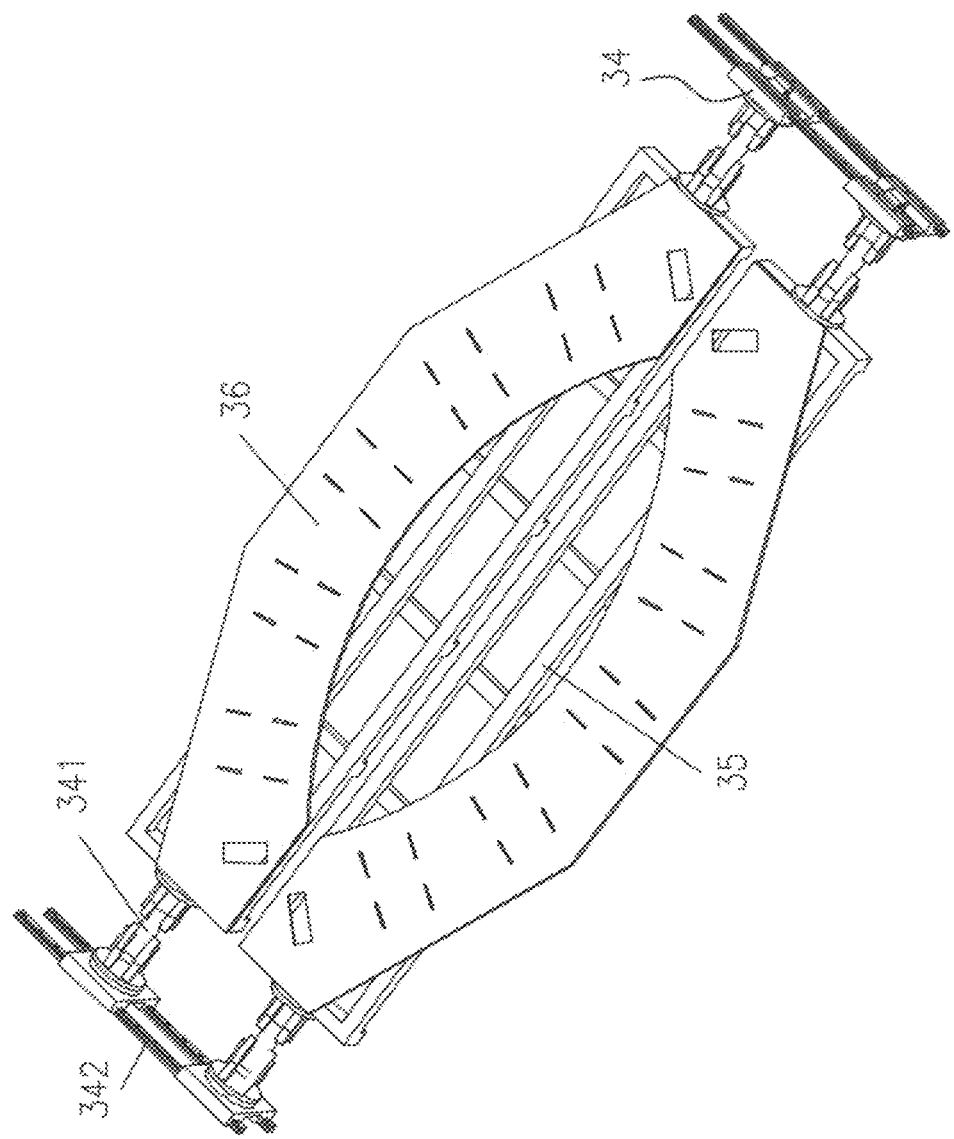
FIG. 9 is a schematic diagram of a setting state of a sub-power structure in a displacement worktable of the present invention.
Figure 10:
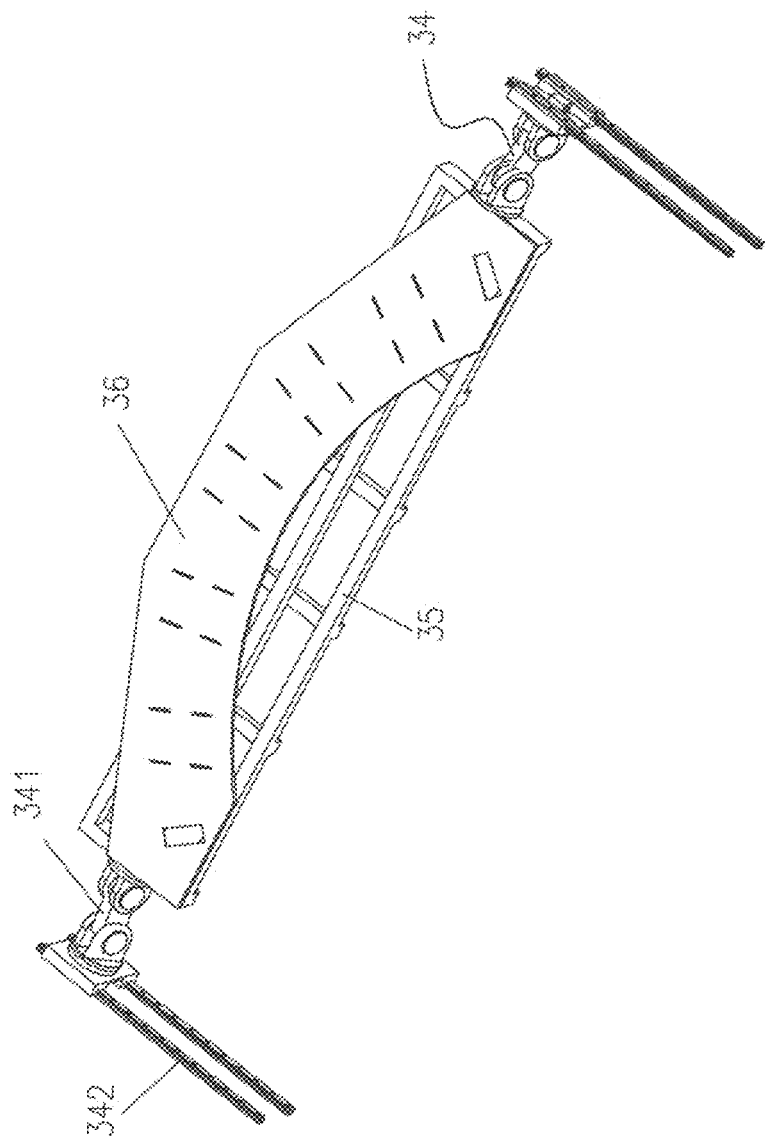
FIG. 10 is a structural schematic diagram of connection between a sub-frame and the sub-power structure of the present invention.
Figure 11:
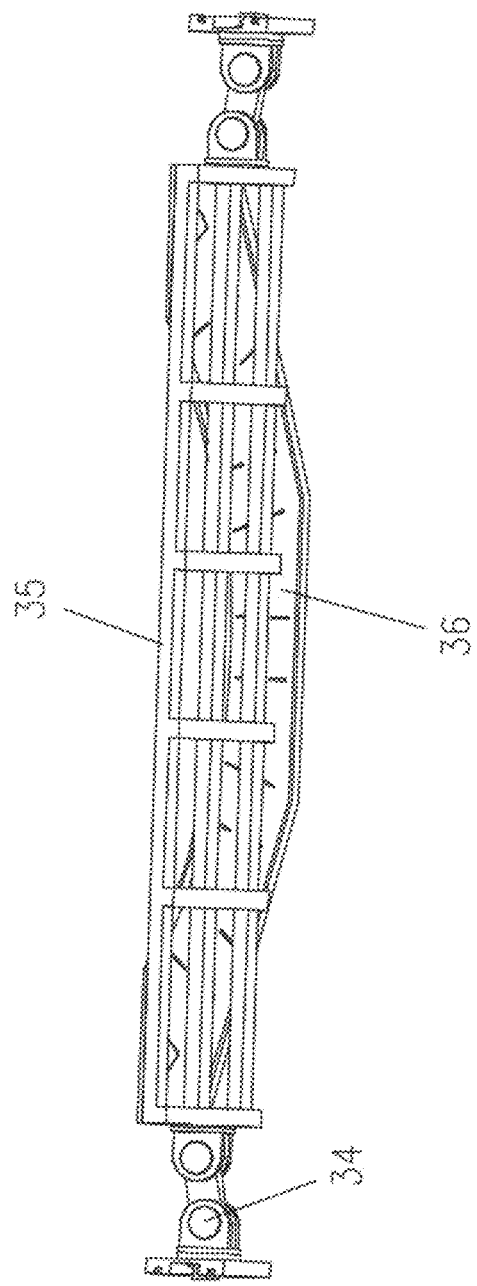
FIG. 11 is a structural schematic diagram of connection of the sub-frame of the present invention.

As shown in FIG. 9, FIG. 10, and FIG. 11, further, the sub-power structure 34 includes a sub-rotary power device 341 and a displacement device 342, the displacement device 342 is arranged inside the main frame 33, and the sub-rotary power device 341 is arranged at an end of a sub-frame 35 to drive the sub-frame 35 to rotate, the displacement device 342 is connected to the sub-rotary power device 341 to drive the sub-rotary power device 341 to translate;

the displacement device 342 includes a displacement guide rail, a sliding table and a translation power device, the displacement guide rail is arranged on an inner side of the main frame 33, the sliding table is movably arranged on the displacement guide rail and connected to the sub-rotary power device 341, the translation power device is connected to the sliding table.

The sub-frame 35 is arranged in pairs, two in total, and different numbers of sub-frame 35 can be set according to the welding construction requirements, at the same time, different numbers of displacement devices 342 are used to make the whole device have different degrees of freedom according to the complexity of the workpiece; when the displacement device 342 is arranged at both ends of the two sub-frames 35, the same end of the two sub-frames 35 is connected to a same displacement bar at the same time, the displacement device 342 is connected to the displacement bar, and the displacement bar and the displacement device 342 are set one, at this time, it is a five degrees of freedom mode, that is, a main rotary power structure 32 is connected to the main frame 33, two sub-rotary power devices 341 are respectively connected to the two sub-frames 35, and two displacement devices 342 are respectively connected to the both ends of the sub-frame 35 arranged in pairs; when the displacement device 342 is arranged at each end of each sub-frame 35, it is a seven degrees of freedom mode, that is, one main rotary power structure 32 is connected to the main frame 33, two sub-rotary power devices 341 are respectively connected to two sub-frame 35, and two displacement devices 342 are respectively connected to both ends of each sub-frame 35, a total of four displacement devices 342; when one end of the two sub-frames 35 is independently connected to one displacement device 342 respectively, and the other end of the two sub-frames 35 is simultaneously connected to the same displacement bar, the displacement bar is connected to the displacement device 342, which is a six degrees of freedom mode.

Preferably, the displacement bar is a screw, which forms a screw nut structure with the sliding table and drives the displacement bar to move through the translation power device, thereby driving the sliding table and the sub-frame 35 on it to move.

The adjustment of parts by seven degrees of freedom is more flexible and can better meet the requirements of welding position, but is costly, and the seven degrees of freedom mode is adopted when the workpiece with asymmetry and high specificity is welded; five degrees of freedom can meet the welding requirements of symmetrical workpieces, and the cost is relatively low; five degrees of freedom mode is adopted when welding the components with symmetrical and regular structure; the six degrees of freedom mode can not effectively meet the specific requirements, the cost control is also poor, and is less commonly adopted.

Further, in the seven degrees of freedom mode of the displacement worktable 3 in this embodiment, the sub-rotary power device 341 is arranged at both ends of the sub-frame 35, and the two displacement devices 342 are respectively connected to the sub-rotary positioner and the sub-rotary shaft of the sub-rotary power device 341, each displacement device 342 independently drives one end of the sub-frame 35 to translate, while the sub-rotary power device 341 between the two displacement devices 342 drives the sub-frame 35 to rotate around the shaft, and cooperates with the translation realized by the displacement device 342 to adjust the position and angle of the sub-frame 35.

As shown in FIG. 7, FIG. 8, FIG. 9, FIG. 10, and FIG. 11, further, in the five degrees of freedom mode of the displacement worktable 3 in this embodiment, the output end of the translation power device is provided with the displacement bar, and the sliding tables of the two sub-frames 35 at the same end are connected to the same displacement bar; the displacement bar is provided with threads in opposite directions, the two sliding tables are respectively arranged on the thread sections in different directions, the screw nut structure is between the sliding table and the displacement bar, the translation power device drives the displacement bar to rotate, and the two sliding tables are driven through the displacement bar to carry out the displacement of closed in the same directions or expand in the opposite directions. One displacement device 342 drives the same end of two sub-frames 35 to close or expand in opposite directions, and the other displacement device 342 drives the other end of the two sub-frames 35 to close or expand in opposite directions relatively independently, and adjusts the position and angle of the sub-frame 35.

Figure 6:
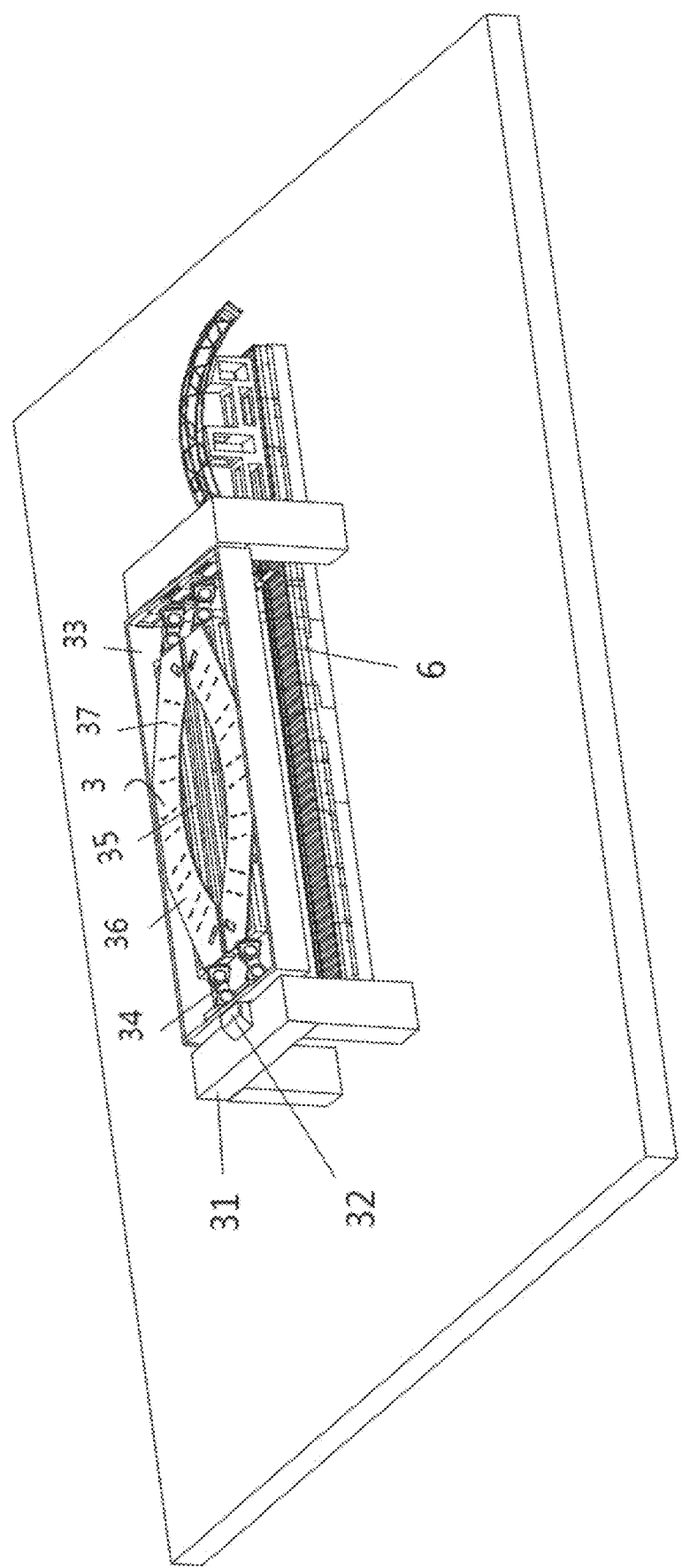
FIG. 6 is a schematic diagram of a setting state of a displacement worktable and a feeding system of the present invention.
Figure 7:
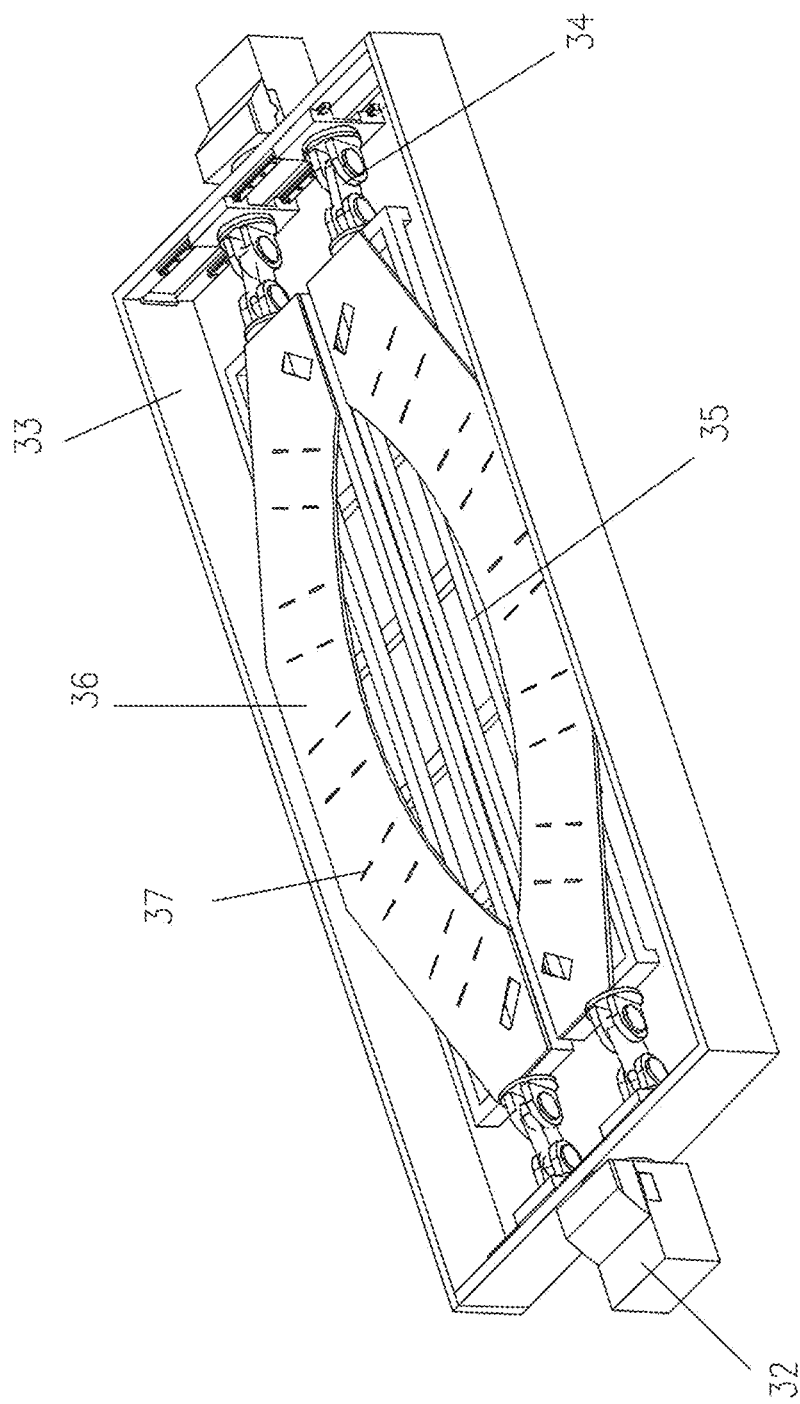
FIG. 7 is a structural schematic diagram of a displacement worktable of the present invention.
Figure 8:
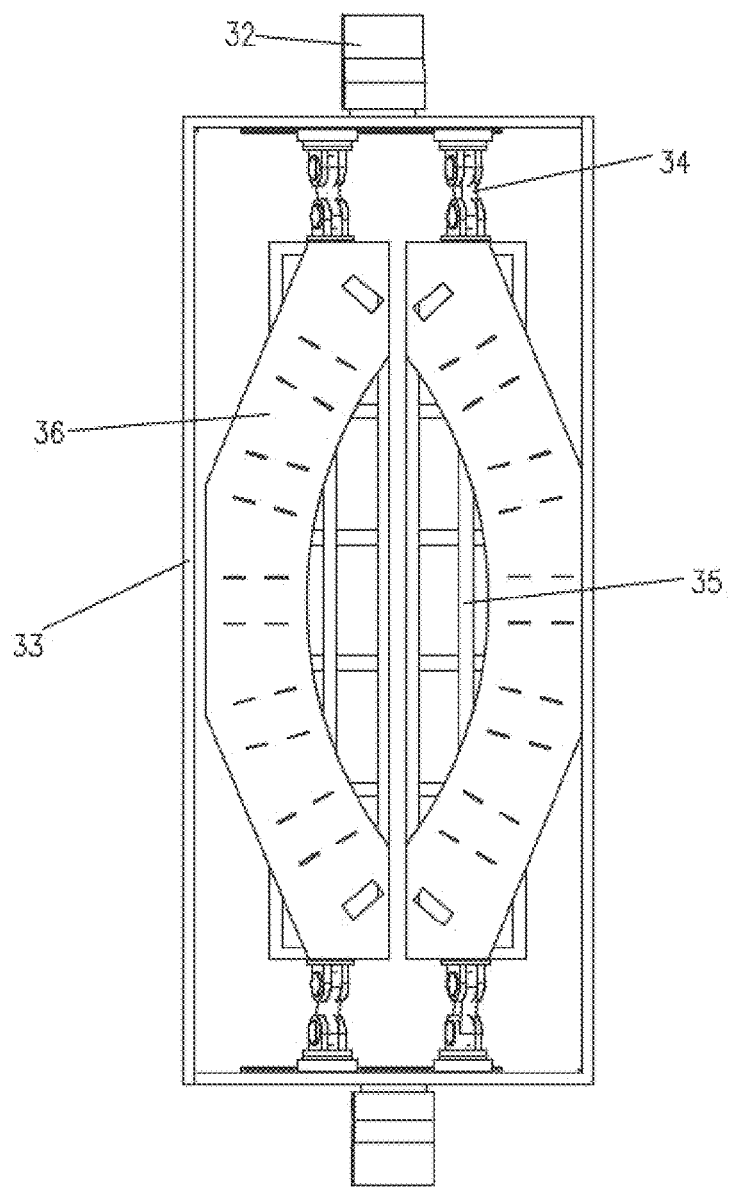
FIG. 8 is a top view schematic diagram of a displacement worktable of the present invention.

As shown in FIG. 6, FIG. 7, and FIG. 8, further, the main rotary power structure 32 includes a main rotary positioner and a main rotary shaft, the main rotary positioner and the main rotary shaft are respectively arranged on an outside of the two ends of the main frame 33 to drive the main frame 33 to rotate, the sub-rotary power device 34 includes a sub-rotary positioner, a sub-rotary shaft and a rotary table, the sub-rotary positioner and the sub-rotary shaft are arranged on the sliding table and located at both ends of the sub-frame 35, the rotary table is connected to the sub-frame 35 through a hinge and is connected to the sub-rotary positioner and the sub-rotary shaft. When adjusting the position of the sub-frame 35 through the displacement device 342, the length of the sub-frame 35 cannot meet the length requirement of the main frame 33, the sub-frame 35 and the auxiliary rotary power device 341 are connected through the hinge to compensate the distance, and the rotary action of the sub-rotary power device 341 is not affected.

Further, the main rotary positioner and the sub-rotary positioner are provided with torque sensors, the torque sensor is used to measure the deflection torque caused by the position deviation of placement of the workpiece and parts, the main frame 33 and the sub-frame 35 are provided with a torque balance block, the torque balance block reduces the deflection torque so that the main rotary positioner and the sub-rotary positioner can be flipped and started; the torque sensor transmits the signal to the control system through measuring the deflection torque caused by the offset of the workpiece position, and calculates the moving distance of the balance block required for the torque balance to realize the torque balance, thereby realizing the different requirements of the sub-frame 35 to close to the center synchronously, to close to the center unilaterally or to close at an angle asynchronously at both ends.

Further, two-stage reducers are arranged on the main rotary positioner and the sub-rotary positioner, because the weight of the main frame 33 and its internal structure plus the workpiece is greater than 3000 kg, the offset is greater than 100 mm, which is much larger than the maximum bearing torque of the conventional motor, therefore, the main rotary positioner and the sub-rotary positioner are designed with a two-stage reduction device to meet the using requirements of offset and bearing capacity, and the maximum reduction ratio is selected to be 185 to reduce the impact inertia.

Further, a positioning fixture structure 37 is arranged on the worktable 36, and the positioning fixture structure 37 is arranged on a surface of the worktable 36, and cooperates with the seam-finding structure 23 and the observation structure 43 to measure the size and placement position of the main parts of the grille, the appropriate clamping force is selected through the database according to the measurement data, and the main parts are axially positioned, curvature corrected and warping corrected, the main parts are adjusted to adapt to different types of grilles.

Further, the sub-frame 35 is arranged in pairs, and the sub-power structure 34 is arranged with the sub-frame 35 correspondingly, the welding robot 2 and the auxiliary robot 4 are symmetrically arranged on both sides of the displacement worktable 3 and cooperate with the sub-frame 35.

Further, the worktable 36 is a multilateral special-shaped structure to improve the accessibility of the robot, and a latitude and longitude dimension positioning beacon is arranged on the worktable 36 to facilitate automatic positioning and homing during welding.

Figure 5:
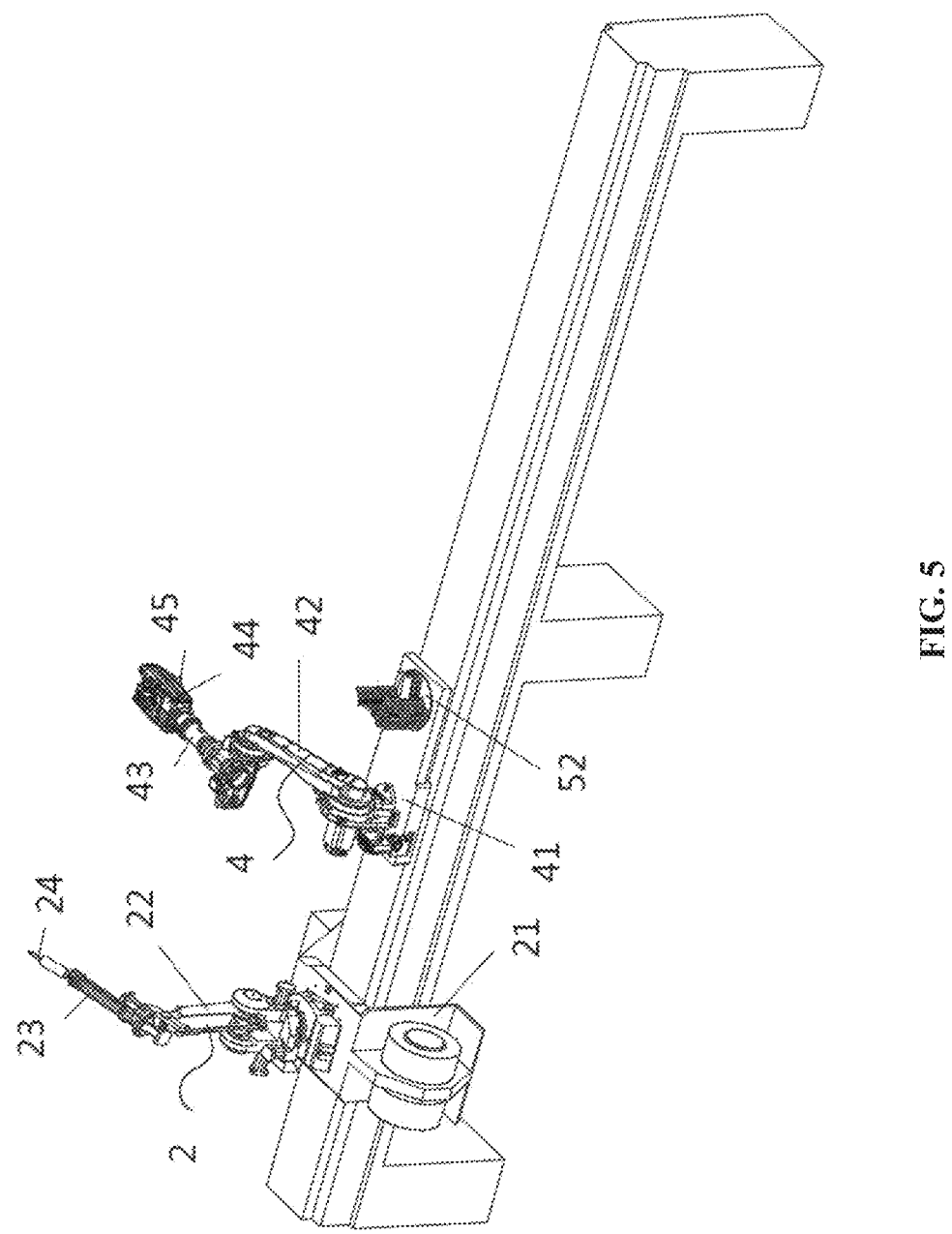
FIG. 5 is a schematic diagram of a setting state of a welding robot and an auxiliary robot of the present invention.

As shown in FIG. 5, further, the welding robot 2 includes a moving base 21, a first manipulator 22, a seam-finding structure 23, and a first welding structure 24, the first manipulator 22 is arranged on the base station 1 through the moving base 21, and the seam-finding structure 23 and the first welding structure 24 are arranged on the first manipulator 22 and cooperated with the worktable 36.

Figure 12:
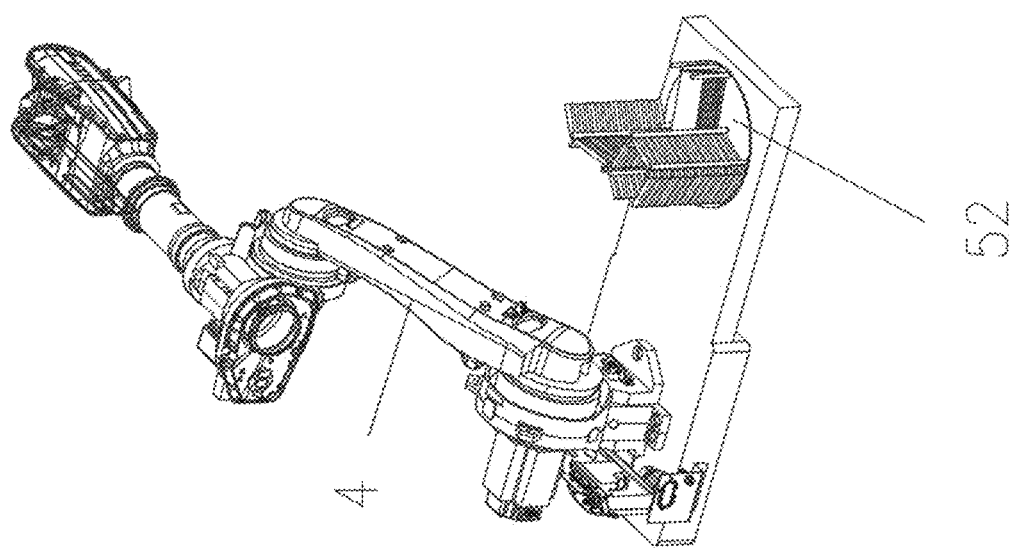
FIG. 12 is a schematic diagram of a setting state of a hopper of the present invention.

As shown in FIG. 5, and FIG. 12, further, the auxiliary robot 4 includes a mounting base 41, a second manipulator 42, an observation structure 43, a second welding structure 44, and an auxiliary fixture 45, the second manipulator 42 is arranged on the base station 1 through the mounting base 41, and the observation structure 43, the second welding structure 44 and the auxiliary fixture 45 are arranged on the second manipulator 42 and cooperated with the worktable 36.

Preferably, the seam-finding structure 23 is a laser positioning system, and provided with a matching weld seam identification and error measurement program to identify the weld seam and perform automatic welding according to the planned trajectory, the first welding structure 24 is an arc welding system, the observation structure 43 is a charge coupled device (CCD) machine vision sensing system, which is used to detect and confirm the size, placement position and shape error of the parts, and cooperate with the positioning fixture structure 37 to correct and fix the parts, the second welding structure 44 is a resistance welding system, and the auxiliary fixture 45 is an auxiliary manipulator end tool.

As shown in FIG. 1, further, the main reinforcement feeding structure 51 of the present invention includes two structures, in structure 1, the main reinforcement feeding structure 51 includes a chain plate conveyor belt 511 and a placing frame 512, and the placing frame 512 is arranged on the base station 1 and located above the displacement worktable 3, when reclaiming is carried out, the main reinforcement conveyed to the placing frame 512 is grasped by the auxiliary robot 4, the chain plate conveyor belt 511 is located on one side of the placing frame 512, and a discharging end of the chain plate conveyor belt is connected to the placing frame 512; the blanking system 6 includes a silo and a conveyor belt, the silo is arranged on the base station 1 and located below the displacement worktable 3, a receiving end of the conveyor belt is connected to the silo.

Figure 13:
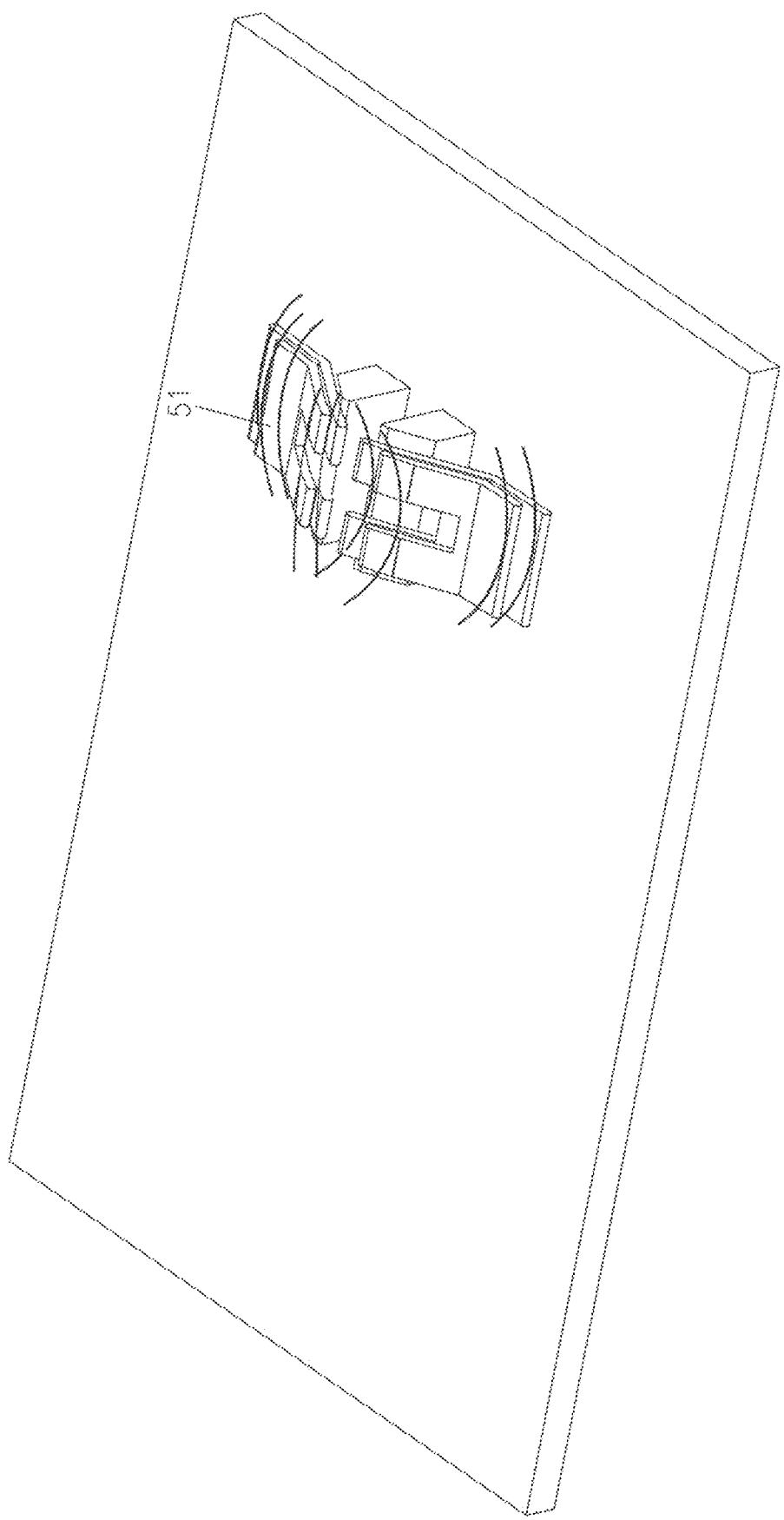
FIG. 13 is a structural schematic diagram of a main reinforcement feeding system of the present invention.

As shown in FIG. 13, further, the chain plate conveyor belt 511 includes a conveyor chain plate and a support frame, the support frame is arranged under the conveyor chain plate, and the conveyor chain plate is arranged as an upward inclined conveyor belt, the main reinforcements of the two specifications are conveyed to the top of the conveyor belt through the conveyor chain plate successively, the main reinforcements fall on the placing frame 512, and the placing frame 512 is arranged above the displacement worktable 3 to facilitate the auxiliary robot to grasp.

Further, the placing frame 512 includes a conveyor rod arranged at intervals, when the main reinforcement falls onto the placing frame 512 through the chain plate conveyor belt 511, the conveyor rod rotates and pushes the main reinforcement forward to the grasping position, and under the control of the control system, whenever the auxiliary robot grasps a main reinforcement, the conveyor rod rotates and pushes the next main reinforcement forward to the grasping position, waiting for the next grasping.

Further, there are three kinds of a up concave type, a down concave type and a flat type of suspension modes of the main reinforcement according to the different number and position of the conveyor rods in the placing frame 512, when the conveyor rod is set to be two and the distance is far, the main reinforcement is down concave suspension, which is used to assist the robot to adopt the top end feeding, at this time, the most convex part of the main reinforcement is facing down, the auxiliary manipulator is closest to the clamping part for top feeding; when the conveying rod is set to be two and the distance is close, the main reinforcement is up concave suspension, which is used to assist the robot to adopt the bottom end feeding, at this time, the most convex part of the main reinforcement is upward, the auxiliary manipulator is closest to the clamping part for bottom feeding; when the conveyor rod is set to be three or more, the main reinforcement is flat suspension, which can be used in the top feeding and the bottom feeding, at the same time, it can minimize the deformation of the reinforcement, and there is no need to change the claw angle again when the main reinforcement is positioned on the welding platform. The present invention adopts top feeding and flat suspension.

Figure 2:
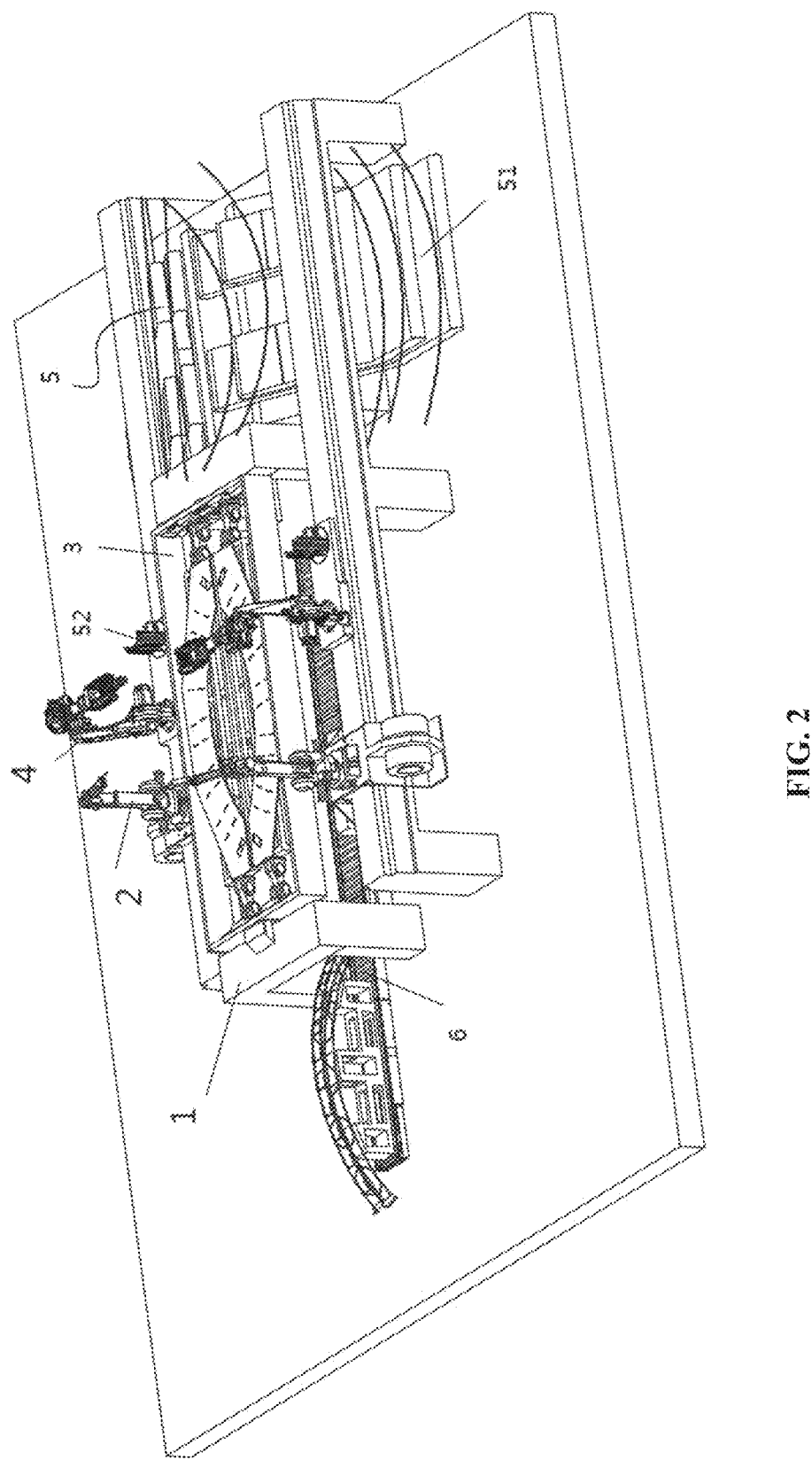
FIG. 2 is a schematic diagram of an overall structure of a main reinforcement feeding by using structure 2 of the present invention.
Figure 3:
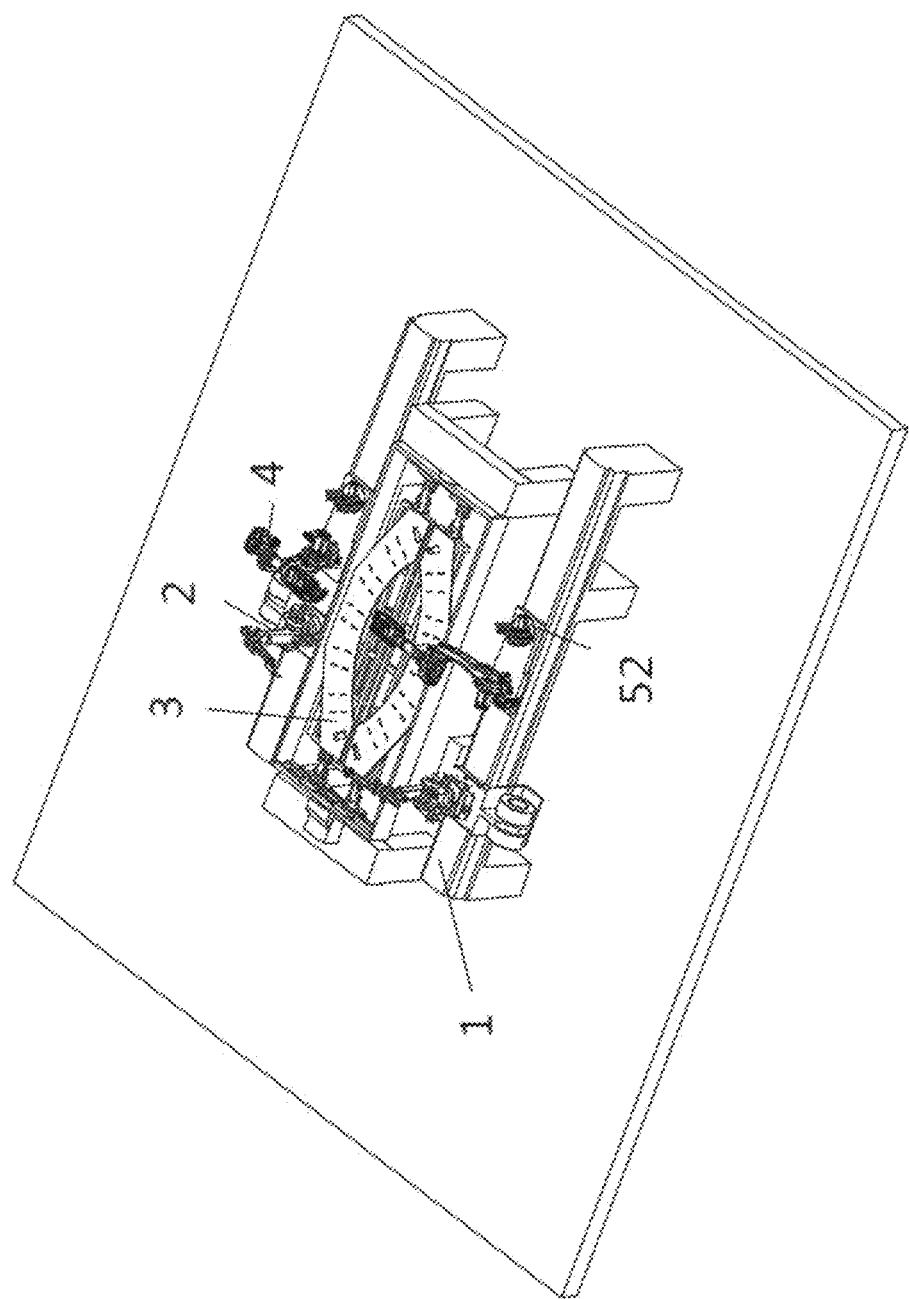
FIG. 3 is a schematic diagram of view 1 of setting the position angle of a robot and a displacement worktable of the present invention.
Figure 4:
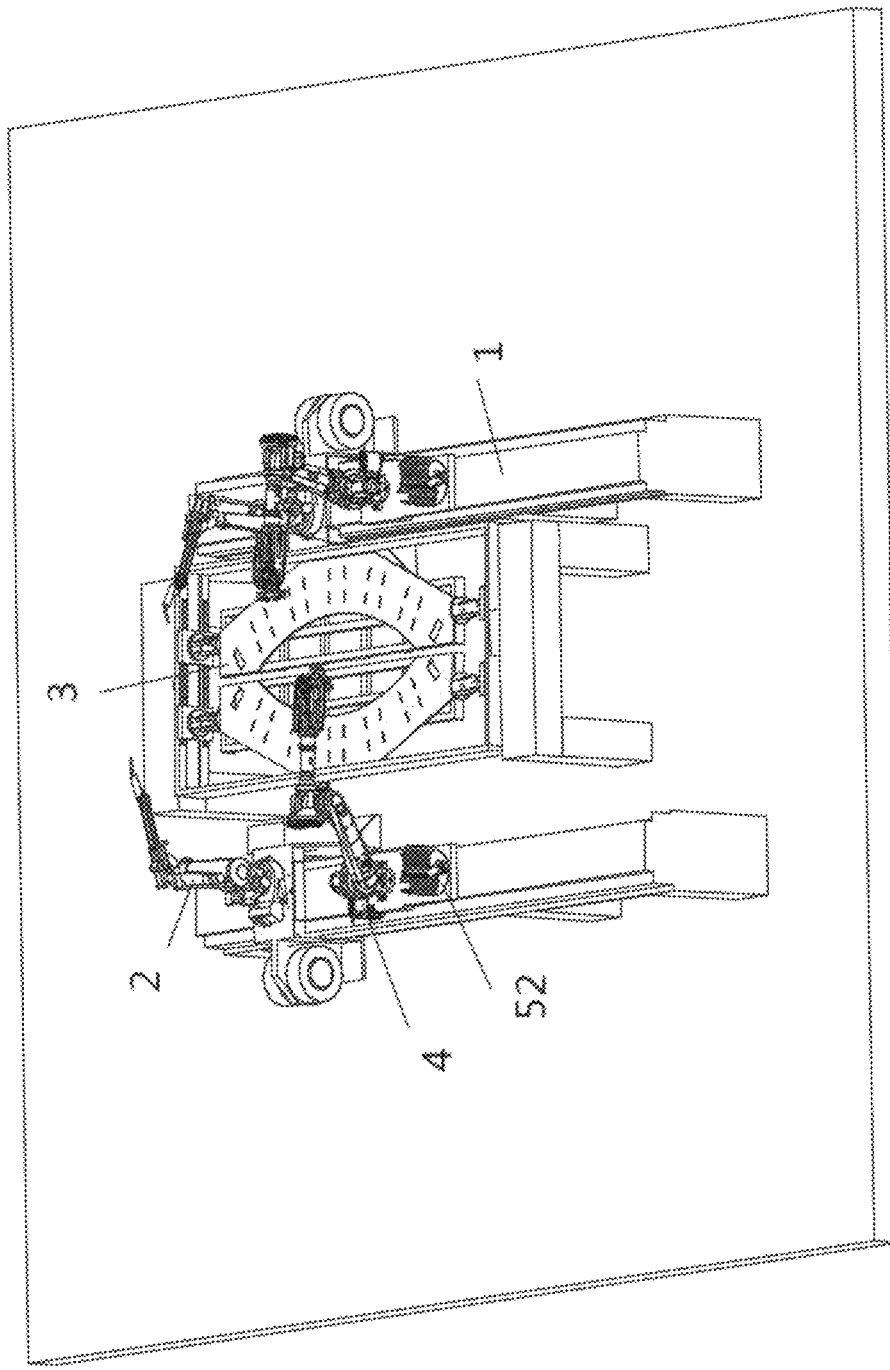
FIG. 4 is a schematic diagram of view 2 of setting the position angle of a robot and a displacement worktable of the present invention.

As shown in FIG. 2, in structure 2 of the main reinforcement feeding structure 51 of the present invention, the main reinforcement feeding structure 51 adopts the chain plate conveyor belt 511 for feeding, and the discharging end of the chain plate conveyor belt 511 is located on the side of the displacement worktable 3, the main reinforcement is conveyed to the top through the chain plate conveyor belt 511, and then welded by the grasping of the auxiliary robot 4.

In the two structures of the main reinforcement feeding structure 51, the auxiliary robot 4 of the structure 1 can carry out the main reinforcement reclaiming without moving, which can effectively improve the operation efficiency, and the placing frame 512 is arranged on the upper part of the displacement worktable 3 to maximize the space utilization of the whole welding system and improve the space utilization rate. Structure 2 has the advantages of a simple structure, simple installation of the production system and low cost.

Further, the feeding of auxiliary parts is carried out by a hopper or feeding conveyor belt, due to the maximum utilization of position and space and the structural limitation of special-shaped parts, the present invention adopts the hopper for feeding, the hopper 52 can be detachably arranged on the mounting base 41, which is located on the inside or side of the second manipulator 42, and the mounting base 41 is movably arranged on the base station 1.

Further, the hopper 52 uses a vertical bar to limit and fix the auxiliary parts, and serves as the grasping recognition point of the auxiliary robot to reduce the difficulty of grasping and improve the accuracy of recognition.

Further, a control system is further included, the control system with the welding robot 2, the displacement worktable 3, the auxiliary robot 4, the feeding system 5 and the blanking system 6 are in a signal connection, and the control system controls the action of the welding robot 2, the displacement worktable 3, the auxiliary robot 4, the feeding system 5 and the blanking system 6, the control system cooperates with the database, and realizes the automatic pipeline welding production by controlling the welding robot 2, the displacement worktable 3, the auxiliary robot 4, the feeding system 5 and the blanking system 6, which greatly reduces the influence of labor on the operation process, production quality and production efficiency, and realizes the integrated, intelligent and automatic welding operation.

The control system is provided with automatic and intelligent operation programs, through weld identification and positioning identification, and through automatic calculation to realize the intelligent welding, the weight analysis of the influencing factors is carried out after each welding is finished, and the analysis results are imported into the database for iterative update, through continuous calculation and optimization, the optimal process path connection parameters are obtained, and the automatic, integrated and intelligent welding production operation for large complex special-shaped three-dimensional components is realized.

A production method of the automatic welding production line for the large complex workpiece, including the following steps:

S1, preliminary preparation: overall model parameters, part specification parameters, construction step parameters and part position parameters in each step of an overall workpiece are input into a database as construction parameters;

S2, part placement: the main reinforcement with two different curvatures is classified and placed on the main reinforcement feeding structure 51 according to the welding sequence, an auxiliary part is placed in the hopper 52, and the hopper 52 is hoisted to the moving base 21;

S3, welding preparation: the equipment is started, the worktable is controlled to level and adjusted a position and an angle according to specifications of the whole workpiece; the main reinforcement feeding structure 51 is started, the chain plate conveyor belt 511 starts to convey the two main reinforcements upward successively, and transmits them to the placing frame 512, the placing frame 512 moves to push the main reinforcements to the grasping position;

S4, reclaiming and adjustment: the auxiliary robot 4 is controlled to grasp the connecting plate from the hopper 52, placed it on the worktable 36 and fixed it through the positioning fixture structure 37, then the auxiliary robot 4 is controlled to grasp the main reinforcement from the placing frame 512 and placed it on the worktable 36 to contact with the connecting plate, the size, position and shape of the main reinforcement are detected through the observation structure 43, and matched and identified with the parameters in the database, the positioning fixture structure 37 is controlled to correct the axial end face positioning, curvature correction and warpage of the main reinforcement according to a matching result, and the main reinforcement and the connecting plate are fixed by spot welding through the second welding structure 44, and then the auxiliary robot 4 is disengaged from the main reinforcement;

S5, preliminary welding operation: a welding position between the main reinforcement and the connecting plate is confirmed through the welding robot 2 according to the seam-finding structure 23, according to the programming path, the welding position of the main reinforcement and the connecting plate is searched, and a welding spot and an arc closing point are determined, the optimal welding trajectory and welding parameters are calculated according to the identification results, and the first welding structure 24 is started to weld to form a primary workpiece; during the welding process, the auxiliary robot 4 detects the position of the main reinforcement through the observation structure 43, and an over-limit position is adjusted through the auxiliary fixture 45;

S6, mid-term welding operation: the welding robot and the auxiliary robot cooperate with the displacement worktable 3 to weld the special-shaped parts to form a secondary workpiece, the specific operation is as follows:

S61, after the welding of the primary workpiece is completed, the auxiliary robot 4 detects the special-shaped parts through the observation structure 43, detects whether the size of the special-shaped parts is out of tolerance, and determines the grasping position point, and then clamps the special-shaped parts through the auxiliary fixture 45;

S62, the Z-shaped auxiliary reinforcement is grasped first, the position of the Z-shaped auxiliary reinforcement is adjusted according to the parameters in the database, the posture of the Z-shaped auxiliary reinforcement is adjusted to make it contact with the main reinforcement, firstly the weld is searched through the seam-finding structure 23, the welding is started after the welding spot and an arc closing point is determined; after one end of the Z-shaped auxiliary reinforcement is welded and fixed, the auxiliary fixture 45 loosens the clamping of the Z-shaped auxiliary reinforcement, and moves to the other end of the Z-shaped auxiliary reinforcement, clamps it with the main reinforcement, and then the other end of the Z-shaped auxiliary reinforcement and the main reinforcement are spot welded and fixed through the second welding structure 44, in this process, the first welding structure 24 continues to carry out the welding operation until the Z-shaped auxiliary reinforcement and the main reinforcement are completely welded, and the operation is repeated until all the Z-shaped auxiliary reinforcement are welded;

S63, the U-shaped auxiliary reinforcement is grasped through the auxiliary fixture 45, the posture of the U-shaped auxiliary reinforcement is adjusted to make it contact with the main reinforcement, the weld position between the U-shaped auxiliary reinforcement and the main reinforcement is confirmed and welded, after one leg of the U-shaped auxiliary reinforcement is welded and fixed, the auxiliary fixture 45 begins to grasp the next U-shaped auxiliary reinforcement and place it until the current welding of the previous U-shaped auxiliary reinforcement is completed;

S64, after the welding of Z-shaped auxiliary reinforcement and U-shaped auxiliary reinforcement is completed, a sheet-like secondary workpiece is formed, at this time, the worktable 36 is still in a horizontal state, and then the welding of the secondary workpiece is carried out;

S7, post-welding operation: after the welding of the secondary workpiece is completed, the displacement worktable 3 is controlled to adjust its own position and angle, the secondary workpieces on the two worktables are flipped and adjusted the position to make two secondary workpieces contact with each other, the unwelded leg on the U-shaped auxiliary reinforcement of one of the secondary workpieces is in contact with the main reinforcement of the other second-level workpiece, the welding robot 2 and the auxiliary robot 4 are welded to form a three-dimensional workpiece, and then the unwelded position is selected to the top with the flip adjustment of the displacement worktable 3, and the welding is continued to form a three-dimensional whole workpiece; and S8, workpiece blanking: the whole workpiece is clamped through an auxiliary fixture 45 of the auxiliary robot 4, then the clamping of the whole workpiece is disengaged from the positioning fixture structure 37, the displacement worktable is controlled to be separated from the whole workpiece, and then the whole workpiece is moved downward through the auxiliary fixture 45 of the auxiliary robot 4, landed in the silo, and then the whole workpiece falls in the silo is transported to the finished product area through the conveyor belt to complete the welding operation.

It will be evident to those skilled in the art that the present invention is not limited to the details of the foregoing illustrative embodiments, and that the present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description, and all changes which come within the meaning and range of equivalency of the claims are therefore intended to be embraced therein and any reference signs in the claims shall not be construed as limiting the claim concerned.

What is claimed is:

1. An automatic welding production line for a large complex workpiece, comprising a base station, a welding robot, a displacement worktable, an auxiliary robot, a feeding system, and a blanking system, wherein the displacement worktable is arranged in the base station, the welding robot and the auxiliary robot are arranged on the base station and located on both sides of the displacement worktable, and move along the base station, the blanking system is arranged on the base station and located below the displacement worktable, the feeding system comprises a main reinforcement feeding structure and a hopper, the main reinforcement feeding structure is connected to the base station, and the hopper is arranged on the auxiliary robot;

the main reinforcement feeding structure comprises a chain plate conveyor belt and a placing frame, the placing frame is arranged on the base station and located above the displacement worktable, the chain plate conveyor belt is located on a side of the placing frame, and a discharging end of the chain plate conveyor belt is connected to the placing frame; the blanking system comprises a silo and a conveyor belt, the silo is arranged on the base station and located below the displacement worktable, and a receiving end of the conveyor belt is connected to the silo;

the displacement worktable comprises support frames, a main rotary power structure, a main frame, a sub-power structure, a sub-frame, and a worktable, the support frames are arranged in a central part of the base station, the main frame is arranged between the support frames, the main rotary power structure is arranged at an end of the main frame and located between the main frame and the support frames, the sub-frame is arranged in the main frame through the sub-power structure, the sub-power structure is arranged at front and rear ends of the sub-frame, and the worktable is arranged on the sub-frame;

the sub-power structure comprises a sub-rotary power device and a displacement device, the displacement device is arranged inside the main frame, the sub-rotary power device is arranged at an end of the sub-frame to drive the sub-frame to rotate, and the displacement device is connected to the sub-rotary power device to drive the sub-rotary power device to translate;

the displacement device comprises a displacement guide rail, a sliding table, and a translation power device, the displacement guide rail is arranged on an inner side of the main frame, the sliding table is movably arranged on the displacement guide rail and connected to the sub-rotary power device, and the translation power device is connected to the sliding table;

the main rotary power structure comprises a main rotary positioner and a main rotary shaft, the main rotary positioner and the main rotary shaft are respectively arranged on outer sides of two ends of the main frame to drive the main frame to rotate, the sub-rotary power device comprises a sub-rotary positioner, a sub-rotary shaft, and a rotary table, the sub-rotary positioner and the sub-rotary shaft are arranged on the sliding table and located at both ends of the sub-frame, the rotary table is connected to the sub-frame through a hinge and is connected to the sub-rotary positioner and the sub-rotary shaft;

the main rotary positioner and the sub-rotary positioner are provided with torque sensors, each of the torque sensors is used to measure a deflection torque caused by a position deviation of placement of the large complex workpiece and parts, and each of the main frame and the sub-frame is provided with a torque balance block;

the welding robot comprises a moving base, a first manipulator, a seam-finding structure, and a first welding structure, the first manipulator is arranged on the base station through the moving base, and the seam-finding structure and the first welding structure are arranged on the first manipulator and cooperated with the worktable;

the auxiliary robot comprises a mounting base, a second manipulator, an observation structure, a second welding structure, and an auxiliary fixture, the second manipulator is arranged on the base station through the mounting base, and the observation structure, the second welding structure and the auxiliary fixture are arranged on the second manipulator and cooperated with the worktable;

a positioning fixture structure is arranged on the worktable, and the positioning fixture structure is arranged on a surface of the worktable, and cooperates with the seam-finding structure and the observation structure;

the sub-frame is arranged in pairs, and the sub-power structure is arranged with the sub-frame correspondingly, the welding robot and the auxiliary robot are symmetrically arranged on both sides of the displacement worktable and cooperate with the sub-frame; and the placing frame comprises a conveyor rod arranged at intervals, when a main reinforcement falls onto the placing frame through the chain plate conveyor belt, the conveyor rod rotates and pushes the main reinforcement forward to a grasping position, the conveyor rod is set to be three or more, the main reinforcement is flat suspension.

2. The automatic welding production line for the large complex workpiece according to claim 1, further comprising a control system, wherein the control system is in signal connection with the welding robot, the displacement worktable, the auxiliary robot, the feeding system and the blanking system, and the control system controls linkage of the welding robot, the displacement worktable, the auxiliary robot, the feeding system and the blanking system.

3. A production method of the automatic welding production line for the large complex workpiece according to claim 1, comprising the following steps:

S1, preliminary preparation: inputting overall model parameters, part specification parameters, construction step parameters and part position parameters in each step of an overall workpiece into a database as construction parameters;

S2, part placement: placing the main reinforcement on the main reinforcement feeding structure according to a specification, a model and a welding sequence, placing an auxiliary part in the hopper, and hoisting the hopper to the moving base, wherein the auxiliary part comprises a connecting plate and a special-shaped part;

S3, welding preparation: starting the equipment, controlling the worktable to level and adjusting a position and an angle according to specifications of the whole workpiece; starting the main reinforcement feeding structure, and conveying the main reinforcement to the placing frame through the chain plate conveyor belt;

S4, reclaiming and adjustment: controlling the auxiliary robot to grasp the connecting plate from the hopper, placing the connecting plate on the worktable and fixing the connecting plate, then controlling the auxiliary robot to grasp the main reinforcement from the placing frame and placing the main reinforcement on the worktable to contact with the connecting plate, detecting a size, a position and a shape of the main reinforcement through the observation structure, and matching the size, the position and the shape of the main reinforcement with parameters in the database, controlling the positioning fixture structure to correct the main reinforcement according to a matching result, and fixing by spot welding through the second welding structure, and then disengaging the auxiliary robot from the main reinforcement;

S5, preliminary welding operation: confirming a welding position between the main reinforcement and the connecting plate through the welding robot according to the seam-finding structure, and welding through the first welding structure to form a primary workpiece; during a welding process, detecting the position of the main reinforcement by the auxiliary robot through the observation structure, and adjusting an over-limit position through the auxiliary fixture;

S6, mid-term welding operation: after completing the welding of the primary workpiece, identifying and detecting the special-shaped parts in the hopper by the auxiliary robot through the observation structure, clamping the special-shaped parts through the auxiliary fixture, adjusting positions of the special-shaped parts according to the parameters in the database to make the special-shaped parts in contact with the main reinforcement, and then carrying out the welding operation successively through the welding robot and the auxiliary robot to weld the special-shaped parts on the primary workpiece to form a secondary workpiece;

S7, post-welding operation: after completing the welding of two or more secondary workpieces, controlling the displacement worktable to adjust a position and an angle of the displacement worktable, adjusting positions of a first secondary workpiece and a second secondary workpiece on the two worktables to make the first and the second secondary workpieces in contact with each other, and carrying out the welding operation successively through the welding robot and the auxiliary robot to weld the first and the second secondary workpieces to each other to form an whole workpiece with a position adjustment of the displacement worktable; and S8, workpiece blanking: clamping the whole workpiece through the auxiliary fixture of the auxiliary robot, then disengaging a clamping of the whole workpiece from the positioning fixture structure, controlling the displacement worktable to be separated from the whole workpiece, and then moving the whole workpiece downward through the auxiliary fixture of the auxiliary robot, landing the whole workpiece in the silo, and then conveying the whole workpiece to a finished product area through the conveyor belt to complete the welding operation.

4. A production method of the automatic welding production line for the large complex workpiece according to claim 2, comprising the following steps:

S1, preliminary preparation: inputting overall model parameters, part specification parameters, construction step parameters and part position parameters in each step of an overall workpiece into a database as construction parameters;

S2, part placement: placing the main reinforcement on the main reinforcement feeding structure according to a specification, a model and a welding sequence, placing an auxiliary part in the hopper, and hoisting the hopper to the moving base, wherein the auxiliary part comprises a connecting plate and a special-shaped part;

S3, welding preparation: starting the equipment, controlling the worktable to level and adjusting a position and an angle according to specifications of the whole workpiece; starting the main reinforcement feeding structure, and conveying the main reinforcement to the placing frame through the chain plate conveyor belt;

S4, reclaiming and adjustment: controlling the auxiliary robot to grasp the connecting plate from the hopper, placing the connecting plate on the worktable and fixing the connecting plate, then controlling the auxiliary robot to grasp the main reinforcement from the placing frame and placing the main reinforcement on the worktable to contact with the connecting plate, detecting a size, a position and a shape of the main reinforcement through the observation structure, and matching the size, the position and the shape of the main reinforcement with parameters in the database, controlling the positioning fixture structure to correct the main reinforcement according to a matching result, and fixing by spot welding through the second welding structure, and then disengaging the auxiliary robot from the main reinforcement;

S5, preliminary welding operation: confirming a welding position between the main reinforcement and the connecting plate through the welding robot according to the seam-finding structure, and welding through the first welding structure to form a primary workpiece; during a welding process, detecting the position of the main reinforcement by the auxiliary robot through the observation structure, and adjusting an over-limit position through the auxiliary fixture;

S6, mid-term welding operation: after completing the welding of the primary workpiece, identifying and detecting the special-shaped parts in the hopper by the auxiliary robot through the observation structure, clamping the special-shaped parts through the auxiliary fixture, adjusting positions of the special-shaped parts according to the parameters in the database to make the special-shaped parts in contact with the main reinforcement, and then carrying out the welding operation successively through the welding robot and the auxiliary robot to weld the special-shaped parts on the primary workpiece to form a secondary workpiece;

S7, post-welding operation: after completing the welding of two or more secondary workpieces, controlling the displacement worktable to adjust a position and an angle of the displacement worktable, adjusting positions of a first secondary workpiece and a second secondary workpiece on the two worktables to make the first and the second secondary workpieces in contact with each other, and carrying out the welding operation successively through the welding robot and the auxiliary robot to weld the first and the second secondary workpieces to each other to form an whole workpiece with a position adjustment of the displacement worktable; and S8, workpiece blanking: clamping the whole workpiece through the auxiliary fixture of the auxiliary robot, then disengaging a clamping of the whole workpiece from the positioning fixture structure, controlling the displacement worktable to be separated from the whole workpiece, and then moving the whole workpiece downward through the auxiliary fixture of the auxiliary robot, landing the whole workpiece in the silo, and then conveying the whole workpiece to a finished product area through the conveyor belt to complete the welding operation.

\* \* \* \* \*